United States Patent
Daguenet et al.

(10) Patent No.: US 7,955,051 B2
(45) Date of Patent: Jun. 7, 2011

(54) DIFFUSER/GUIDE VANE ASSEMBLY FOR A TURBOMACHINE

(75) Inventors: Luc Henri Claude Daguenet, Corbeil Essonnes (FR); Sandrine Gandelot, Montrouge (FR); Guy Vieillefond, Morsang sur Orge (FR)

(73) Assignee: SNECMA, Paris (FR)

( * ) Notice: Subject to any disclaimer, the term of this patent is extended or adjusted under 35 U.S.C. 154(b) by 993 days.

(21) Appl. No.: 11/778,964

(22) Filed: Jul. 17, 2007

(65) Prior Publication Data

US 2010/0028147 A1    Feb. 4, 2010

(30) Foreign Application Priority Data

Jul. 19, 2006  (FR) ..................................... 06 06540

(51) Int. Cl.
*F04D 29/44* (2006.01)
(52) U.S. Cl. ................ 415/208.3; 415/209.3; 415/211.2
(58) Field of Classification Search ............... 415/208.2, 415/208.3, 208.4, 208.5, 209.3, 209.4, 210.1, 211.1; 416/213 R
See application file for complete search history.

(56) References Cited

U.S. PATENT DOCUMENTS

| 3,909,157 A * | 9/1975 | Wachtell et al. ........... 415/208.3 |
| 4,251,183 A * | 2/1981 | Liu et al. .................... 415/209.3 |
| 7,094,024 B2 * | 8/2006 | Nguyen et al. ................ 415/185 |
| 2007/0036646 A1 * | 2/2007 | Nguyen et al. ............. 415/208.3 |

FOREIGN PATENT DOCUMENTS

| EP | 1 143 108 A1 | 10/2001 |
| FR | 823.442 | 1/1938 |
| WO | WO 01/29424 A1 | 4/2001 |
| WO | WO 02/06676 A1 | 1/2002 |
| WO | WO 2005/042946 A1 | 5/2005 |

* cited by examiner

*Primary Examiner* — Richard Edgar
(74) *Attorney, Agent, or Firm* — Oblon, Spivak, McClelland, Maier & Neustadt, L.L.P.

(57) ABSTRACT

A diffuser/guide vane assembly for an aircraft turbojet or turboprop engine is disclosed. The diffuser includes annular flanges joined by blades and the guide vane assembly includes cylindrical shelves joined by vanes. The annular flanges and the cylindrical shelves are formed from metal sheets to which the vanes are assembled by brazing.

9 Claims, 4 Drawing Sheets

US 7,955,051 B2

DIFFUSER/GUIDE VANE ASSEMBLY FOR A TURBOMACHINE

BACKGROUND OF THE INVENTION

The invention relates to a diffuser/guide vane assembly intended for supplying air to an annular combustion chamber in a turbomachine, such as an aircraft turbojet or turboprop engine.

DESCRIPTION OF THE PRIOR ART

In certain constructions, the last stage of the compressor for supplying a turbomachine is a centrifugal stage, the output of which is surrounded by a radial annular diffuser. This diffuser is joined at the outlet to a cylindrical annular guide vane assembly, which supplies an annular combustion chamber.

The manufacture of the radial diffuser and cylindrical guide vane assembly poses a number of problems. This is because, in the solutions that have been proposed hitherto, at least part of the diffuser/guide vane assembly is cut from bulk material, the other part being produced by casting or by welding and fastened by bolts to the first part or to a casing.

The small thickness of the vanes and the flanges and shelves of the diffuser and guide vane assembly means that it is very difficult to produce these parts by cutting into bulk material, with the consequence that the manufacturing scrap rates may be high and there are very few companies or individuals capable of manufacturing them, so that the cost of these parts is high and there may be supply problems.

The object of the invention is in particular to provide a simple satisfactory and inexpensive solution to this problem.

SUMMARY OF THE INVENTION

For this purpose the invention provides a diffuser/guide vane assembly intended for supplying air to an annular combustion chamber in a turbomachine, this diffuser/guide vane assembly comprising a radial diffuser having two annular flanges, which are joined by vanes with a substantially helical inclination, and an annular guide vane assembly placed at the outlet of the diffuser and having two cylindrical shelves joined by substantially radial vanes, wherein the annular flanges of the diffuser and the cylindrical shelves of the guide vane assembly are formed from metal sheets to which the vanes are fastened by brazing.

This results in substantial advantages in terms of manufacturing simplicity and cost. By using metal sheets for the flanges of the diffuser and for the shelves of the guide vane assembly it is possible to avoid complex machining operations and large material supplies, and also reduces the total mass, the overall cost being at least 30% lower than that of the same diffuser/guide vane assembly produced by means of current techniques.

According to another feature of the invention, the metal sheets of the diffuser and of the guide vane assembly include apertures into which the ends of the vanes are fitted and brazed.

Advantageously, the ends of the vanes are brazed over their entire perimeter in the apertures of the flanges of the diffuser.

In a preferred embodiment of the invention, the apertures of the metal sheets are formed by laser cutting.

The radially internal ends of the annular flanges of the diffuser are joined to annular walls that are equipped with fastening rims and which lie radially to the inside of the vanes of the diffuser, so that they do not impede the brazing of the ends of the vanes in the apertures formed in the flanges.

The vanes of the diffuser and those of the guide vane assembly may be produced by ECM (electrochemical machining).

BRIEF DESCRIPTION OF THE DRAWINGS

The invention will be more clearly understood and other features detailed and advantages thereof will become more clearly apparent on reading the following description, given by way of example and with reference to the appended drawings in which.

DESCRIPTION OF THE PREFERRED EMBODIMENTS

Figure 1:
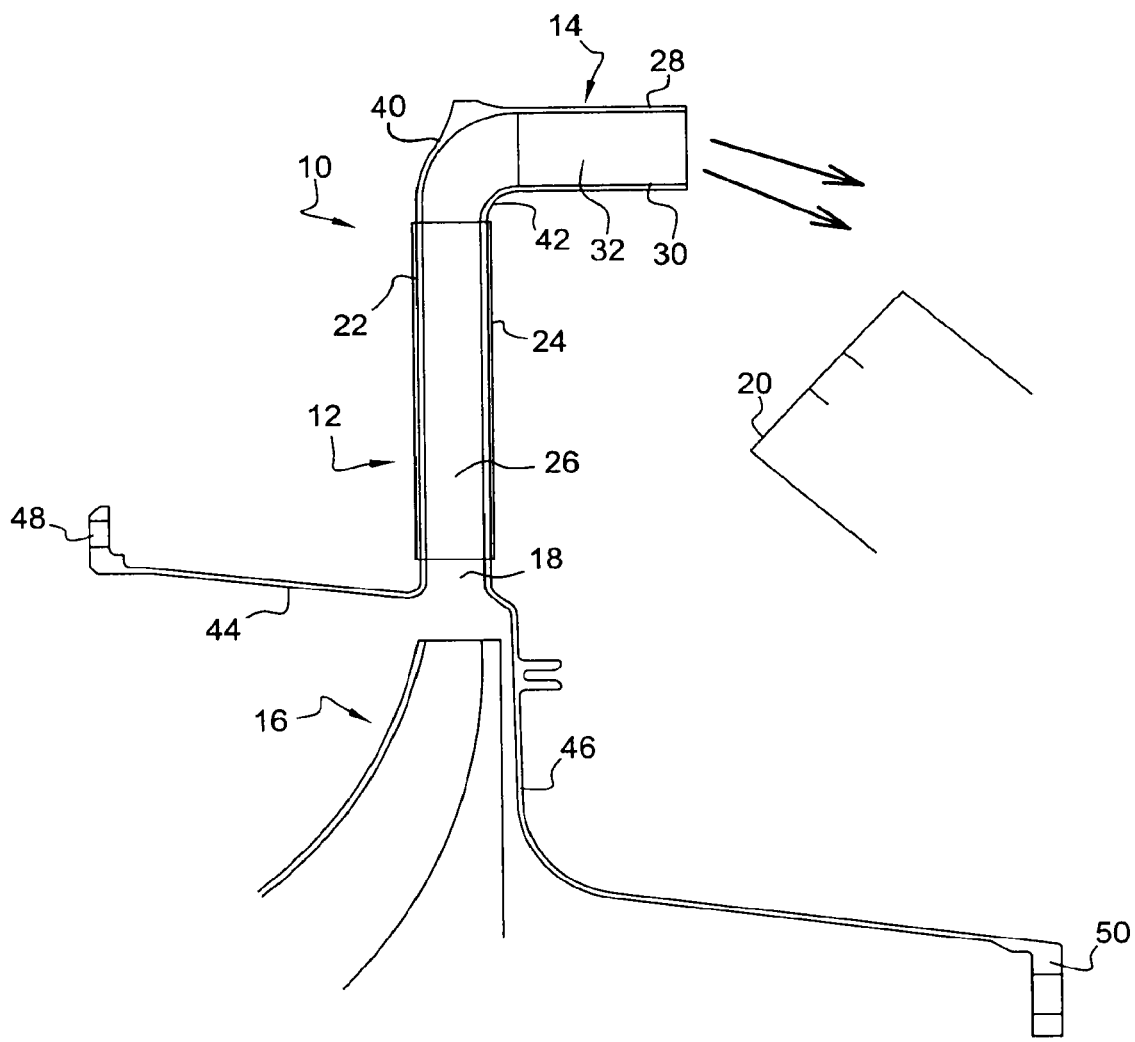
FIG. 1 is a schematic half-view in axial section of a diffuser/guide vane assembly according to the invention.
Figure 2:
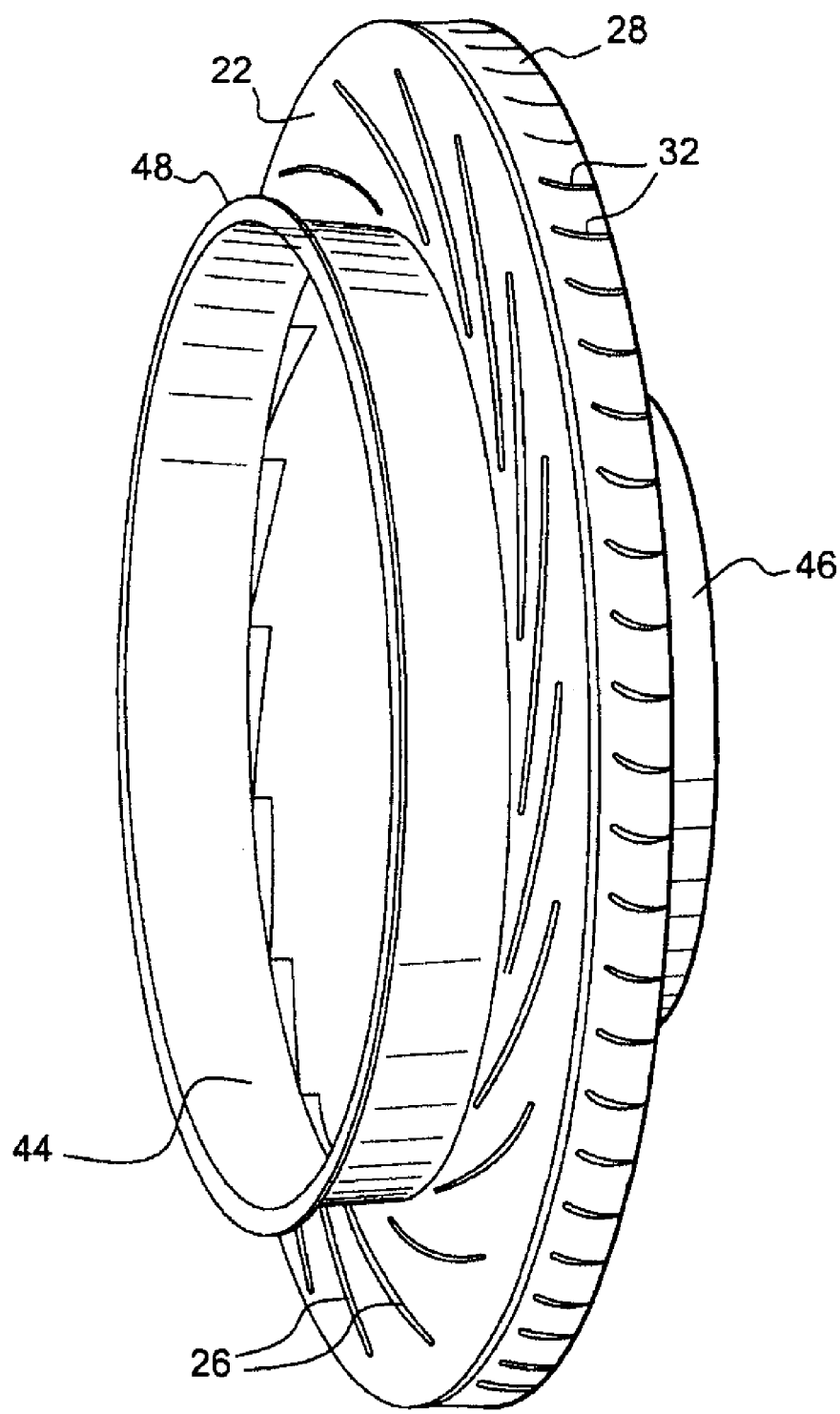
FIGS. 2 and 3 are schematic views in perspective of this diffuser/guide vane assembly.
Figure 3:
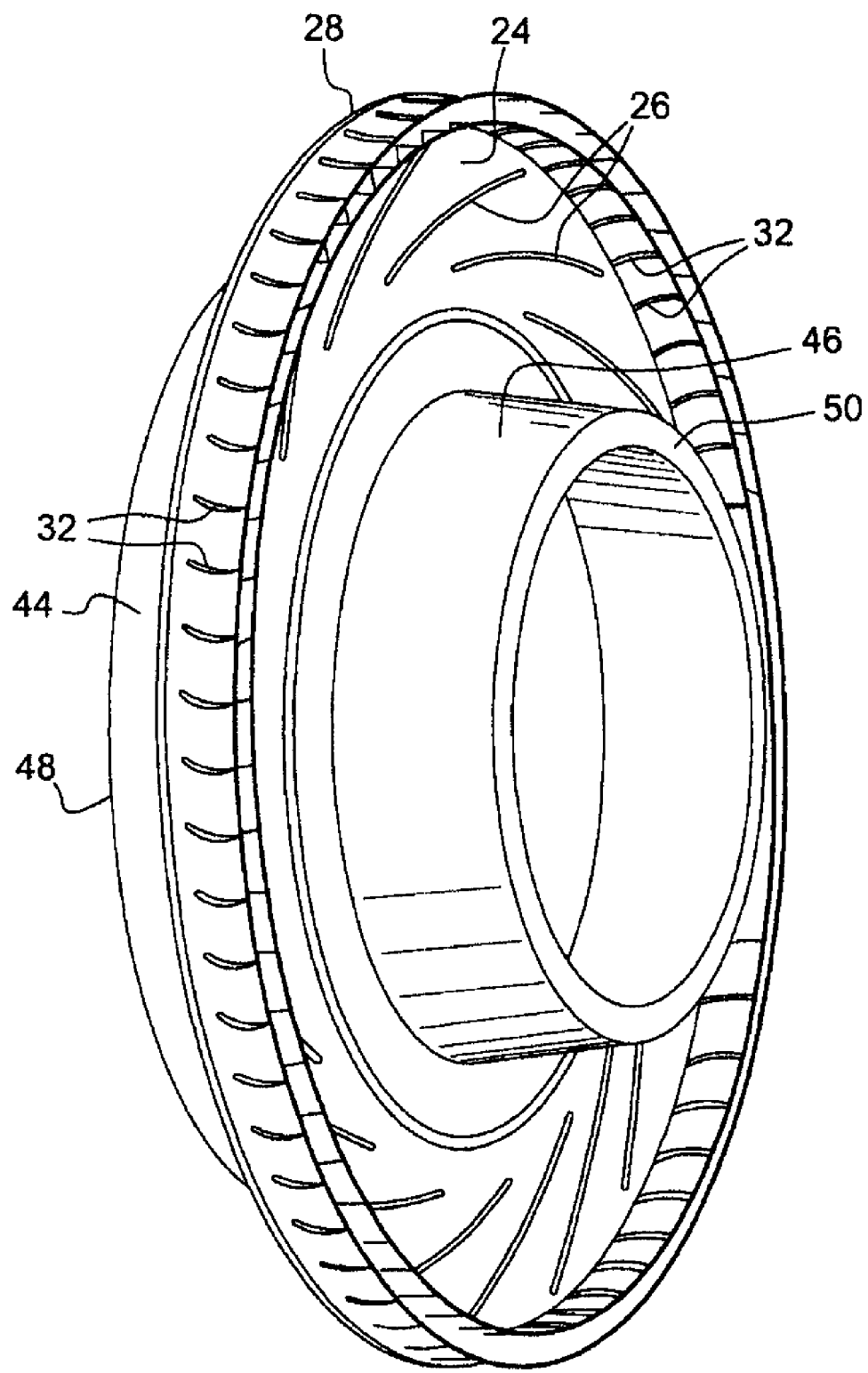
Figure 4:
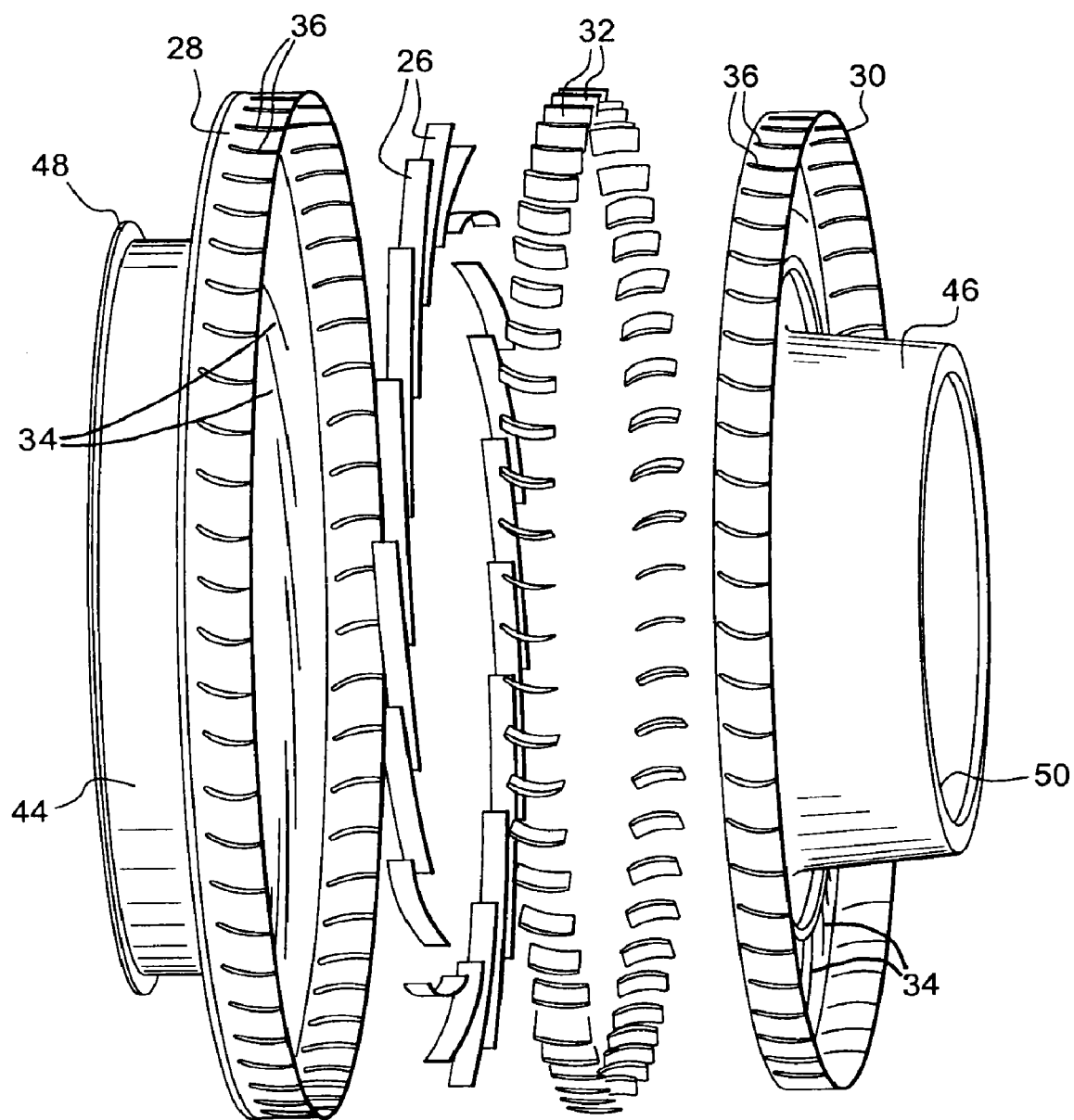
FIG. 4 is a schematic view in exploded perspective of this diffuser/guide vane assembly.

The diffuser/guide vane assembly 10 shown in the appended drawings comprises a radial annular diffuser 12 joined at the outlet to a cylindrical annular guide vane assembly 14, this diffuser/guide vane assembly being intently mounted on the outlet of the final centrifugal stage 16 of a compressor of a turbomachine, such as an aircraft turbojet or turboprop engine, the inlet 18 of the diffuser 12 being aligned radially with the outlet of the centrifugal stage 16, the outlet of the guide vane assembly 14 supplying air to an annular combustion chamber 20, as is well known to those skilled in the art.

According to the invention, the guide vane assembly 12 comprises an upstream annular flange 22 and a downstream annular flange 24 which are parallel and extend annularly around the rotation axis of the compressor and are joined together by vanes 26 having a substantially helical orientation about the rotation axis of the compressor.

The guide vane assembly 14 comprises two cylindrical shelves, an external shelf 28 and an internal shelf 30 respectively, which are coaxial and arranged, one inside the other, and are joined by substantially radial vanes 32.

The annular flanges 22 and 24 of the diffuser and the cylindrical shelves 28 and 30 of the guide vane assembly are formed from metal sheets to which the ends of the vanes 26 and 32, respectively, are fastened by brazing.

For this purpose the annular flanges 22 and 24 of the diffuser include apertures 34 having the shape of the upstream ends of the vanes 26, these apertures being formed by laser cutting. Likewise, the cylindrical shelves 28 and 30 of the guide vane assembly include apertures 36 formed by lasing cutting and having the shape of the radially external and radially internal edges of the vanes 32.

This makes it possible for the ends of the vanes 26, 32 to be fitted into the apertures 34, 36 in order to be assembled by brazing all around their perimeter, it being possible for the edge of the vanes to project slightly from the outer faces of the annular flanges 22, 24 or of the shelves 28, 30, respectively, or to be just flush with the outer faces of the annular flanges 22, 24 or those of the shelves 28, 30.

As shown in FIG. 1, the upstream annular flange 22 of the diffuser may be joined to the outer cylindrical shelf 28 of the guide vane assembly via an annular linking piece 40, and the downstream annular flange 24 of the diffuser may be joined to the internal or cylindrical shelf of the guide vane assembly via an annular linking piece 42, these linking pieces 40 and 42 being made of metal sheet and fastened to the ends of the annular flanges and to those of the shelves by TIG (Tungsten Inert Gas) welding.

The radially internal ends of the annular flanges 22 and 24 are joined to upstream 44 and downstream 46 annular walls, respectively, also by TIG welding. The annular walls 44 and 46 are equipped at their free end with a fastening rim 48, 50, fastened by TIG welding.

In order for the vanes 26 of the diffuser to be properly fastened over the entire length of their perimeter to the annular flanges 22 and 24, the annular walls 44 and 46 are joined to the annular flanges 22, 24, respectively, radially to the inside of the lower edges of the vanes 26 and not to the outside of these lower edges, as is generally the case in the prior art.

Brazing the vanes over the entire length of their perimeter guarantees better mechanical integrity and allows suitable inspection of the brazed joints.

The use of metal sheets to form the annular flanges of the diffuser and the shelves of the guide vane assembly makes it possible to make a relatively large saving in weight, greatly simplifies the manufacture of the diffuser/guide vane assembly 10 and lowers its cost by at least 30%. Moreover, in this way all the difficulties of supply and of finding suppliers, as encountered in the prior art, are thus avoided.

What is claimed is:

1. A diffuser/guide vane assembly for supplying air to an annular combustion chamber in a turbomachine, comprising:
   a radial diffuser including an upstream annular flange, a downstream annular flange and a first set of vanes with a substantially helical inclination, the upstream annular flange and downstream annular flange are parallel to each other and each extend annularly around an axis of the turbomachine, upstream ends of the first set of vanes are fastened to the upstream annular flange by brazing and downstream ends of the first set of vanes are fastened to the downstream annular flange by brazing;
   an annular guide vane assembly placed at the outlet of the diffuser including an external cylindrical shelf, an internal cylindrical shelf, arranged coaxial with and inside of the external cylindrical shelf, and a second set of substantially radial vanes, outer radial ends of the second set of vanes are fastened to the external cylindrical shelf by brazing and inner radial ends of the second set of vanes are fastened to the internal cylindrical shelf by brazing;
   a first outer annular linking piece with a first end fastened to the upstream annular flange and a second end fastened to the external cylindrical shelf; and
   a second inner annular linking piece with a first end fastened to the downstream annular flange and a second end fastened to the internal cylindrical shelf,
   wherein the upstream and downstream annular flanges of the diffuser, the external and internal cylindrical shelves of the guide vane assembly and the first and second annular linking pieces are formed from metal sheets, and
   wherein the metal sheets of the upstream and downstream annular flanges include apertures into which the upstream and downstream ends of the first set of vanes are fitted and brazed, respectively, and the metal sheets of the external and internal cylindrical shelves include apertures into which the outer radial and inner radial ends of the second set of vanes are fitted and brazed, respectively.

2. The diffuser/guide vane assembly as claimed in claim 1, wherein the ends of the first set of vanes are brazed over their entire perimeter in the apertures of the flanges and the ends of the second set of vanes are brazed over their entire perimeter in the apertures of the shelves.

3. The diffuser/guide vane assembly as claimed in claim 1, wherein the apertures of the metal sheets are formed by laser cutting.

4. The diffuser/guide vane assembly as claimed in claim 1, wherein radially internal ends of the upstream and downstream annular flanges of the diffuser are fastened to upstream and downstream annular walls, respectively, that are equipped with fastening rims and which lie radially to the inside of the vanes of the diffuser.

5. The diffuser/guide vane assembly as claimed in claim 4, wherein the upstream and downstream annular flanges of the diffuser are fastened by TIG welding to the first ends of the upstream and downstream annular walls, respectively.

6. The diffuser/guide vane assembly as claimed in claim 5, wherein the fastening rims are fastened to second ends of the upstream and downstream annular walls.

7. The diffuser/guide vane assembly as claimed in claim 6, wherein the fastening rim fastened to the upstream annular wall is disposed radially outward to the fastening rim fastened to the downstream annular wall.

8. The diffuser/guide vane assembly as claimed in claim 1, wherein the first set and second set of vanes are produced by ECM machining.

9. A turbomachine comprising a diffuser/guide vane assembly as claimed in claim 1.

* * * * *